United States Patent
Lowry et al.

(10) Patent No.: US 8,700,439 B2
(45) Date of Patent: Apr. 15, 2014

(54) ACTION CONSOLE FRAMEWORK

(75) Inventors: Andrew R. Lowry, Ardsley, NY (US);
Lawrence Beck, New York, NY (US);
Sanjaya Wickramasinghe, Enfield
(GB); John Perkoff, Milburn, NJ (US);
Ming Infante, New York, NY (US);
Anthony Oricoli, Baldwin, NY (US)

(73) Assignee: Morgan Stanley, New York, NY (US)

( * ) Notice: Subject to any disclaimer, the term of this patent is extended or adjusted under 35 U.S.C. 154(b) by 1926 days.

(21) Appl. No.: 11/529,769

(22) Filed: Sep. 27, 2006

(65) Prior Publication Data

US 2007/0124361 A1 May 31, 2007

Related U.S. Application Data

(60) Provisional application No. 60/721,289, filed on Sep. 27, 2005.

(51) Int. Cl.
*G06Q 10/00* (2012.01)
(52) U.S. Cl.
USPC .......................................... 705/7.13
(58) Field of Classification Search
USPC ................................... 705/9, 7.13
See application file for complete search history.

(56) References Cited

U.S. PATENT DOCUMENTS

| | | | |
|---|---|---|---|
| 6,067,523 A * | 5/2000 | Bair et al. | 705/3 |
| 2002/0194045 A1* | 12/2002 | Shay et al. | 705/8 |
| 2004/0078258 A1* | 4/2004 | Schulz et al. | 705/9 |
| 2005/0043979 A1* | 2/2005 | Soares et al. | 705/7 |
| 2006/0085374 A1* | 4/2006 | Mayes et al. | 707/1 |
| 2006/0200476 A1* | 9/2006 | Gottumukkala et al. | 707/100 |
| 2007/0027915 A1* | 2/2007 | Morris | 707/104.1 |
| 2007/0162295 A1* | 7/2007 | Akhtar et al. | 705/1 |

OTHER PUBLICATIONS

Murata et al. "Handling of Irregularities in Human Centered Systems: A Unified Framework for Data and Processes." IEEE Transactions on Software Engineering, vol. 26, No. 10, p. 959, Oct. 2000.*

* cited by examiner

*Primary Examiner* — Susanna M Meinecke Diaz
(74) *Attorney, Agent, or Firm* — K&L Gates LLP

(57) ABSTRACT

An apparatus, system and method includes an action manager to receive a manual action selected by a user and an action console coupled to the action manager to present via the action console a user interface specific to the manual action selected by the user. The apparatus, system and method display a directory having one or more manual actions to a user, receives a selection identifying a manual action from the user; and submits the identified manual action to an automated workflow process to execute the identified manual action.

19 Claims, 8 Drawing Sheets

FIG. 3

| | File Edit View Favorites Tools Help |
|---|---|
| | Address |
| | Links Dict ACF Eclipse Jdoc IT Time Entry JavaDoc 1.4.2 Mozilla-Firefox Support OpenAFSOnWindowsFAQ EAI TWIN Search WebN |

300

Enterprise Query Services — 302

EQS Home | DIRECTORY | SEARCH | SUPPORT | LOGOUT  Help

Positions & Balances | Journals | Legacy Journals | Trades | Trades Completion
Positions & Balances > Basic Balances Views [G] As-On TD & SD Basic Balances View ▼ | Edit | Delete ✗ | Reference Data Account No. 004CXXXX ← 304-1       From Query Date  2/25/2005 ▼ ← 304-4
Security ID ← 304-2                 Transaction Ccy ← 304-5     To Query 2/25/2005 ▼ ← 304-6
Options... ▼ ← 304-3                                            Date 2/25/2005 ▼ ← 304-7
                                     □ Show rows with zero Qty/Amt's  □ Reconstruct all dates   Format Default ▼ ← 304-8  Clear  Submit 304-1-n ↙

| Go | Query Date | Account No. | Level | Taps Cusip | Core Bal Type | As on TD Amt | Last TD Journal | AS on SD Amt | Last SD Journal | Tran Ccy | Ledger | Ledger Ccy | Held At | Cpny Code | Asset Dsc |
|---|---|---|---|---|---|---|---|---|---|---|---|---|---|---|---|
| ▶ | 02/02/2005 | 004C1XXX19 | Account | | Legacy Type 1 Amount | 307.82 | 02/25/2005 | 0.00 | 02/25/2005 | USD | Txn | USD | MS | 0201 | |
| ▶ | | | Account | | Legacy Type 1 Amount | 7.82 | 02/25/2005 | 0.00 | 02/25/2005 | USD | Base | USD | MS | 0201 | |

306-2 ↗                    306-1 ↗

Adu P&B
Basic Journal
Enterprise Announcements
Pricing
Fund Balances
Pending Settlements
Trades
Write-Off Action Next▷ Last▷▷
← 308
← 310 http://                                                         Local intranet

Enterprise Query Services | EQS Home | Directory | Search | Support | Logout

400

Write-off Action ← 402

Original Balance:

| Account No. | Account Name | Level | Core Bal Type | Tran Ccy | As On TD Amt | Ledger | AS On SD Amt | Ledger Ccy | Held At | Cpny Code | Cpny LOC |
|---|---|---|---|---|---|---|---|---|---|---|---|
| 004CXXXX | John Q. Doe | Account | Legacy Type 1 Amount | USD | 7.82 | TXN | 7.82 | USD | MS | 0201 | NY |

404 ⟶ To Account: 406

| Account No. | Account Name | Core Bal Type |
|---|---|---|
| 0540XXXX | Money Diff Over/Under-Gvt | Legacy Type 0 Amount |

409

From Account:

| Account No. | Core Bal Type | Tran Ccy | DR/CR | Posting Amount |
|---|---|---|---|---|
| 004CXXXX | Legacy Type 1 Amount | USD | Credit | 7.82 |

408

Other Details: ← 410

| Effective Date | Reason | Comments |
|---|---|---|
| 04/26/2005 | Settlement Difference ▸ Problem with Wire Cancel/ Correct Issue Other | |

412

[ Submit ] [ Reset ] [ Exit ]

| | OID | Source Account | Target Accout | EventState | CreateDate | CreateUserId |
|---|---|---|---|---|---|---|
| ▲ | 9FZvwHCx2RGi2L6mXfDXh1gA | 004CXXXX | 0840XXXX | PENDING_NEW | 04/20/2005 12:00:00 AM | arkadiyk |
| ▲ | F_RK3aWwRHgXUATVQpOdGwA | 004CXXXX | 0840XXXX | ERROR | 04/22/2005 12:00:00 AM | atsushin |
| ▲ | WrxONy9-RTWiMJRDZR89MwA | 004CXXXX | 0840XXXX | PENDING_NEW | 04/22/2005 12:00:00 AM | atsushin |
| ▲ | N41H48nGR6WIHJQaybNVvQA | 004CXXXX | 0840XXXX | AUTHORIZED | 04/22/2005 12:00:00 AM | atsushin |
| ▲ | hZVNrwjQSK6-J34ZDMpkwA | 004CXXXX | 0840XXXX | UNAUTHORIZED | 04/22/2005 12:00:00 AM | atsushin |
| ▲ | wlb9Kt-y2RGiv9-ZCcSI8gA | 004CXXXX | 0840XXXX | AUTHORIZED | 04/22/2005 12:00:00 AM | arkadiyk |
| ▲ | yqipK-Sy2RG_vt-ZCcSI8gA | 004CXXXX | 0840XXXX | PENDING_NEW | 04/25/2005 12:00:00 AM | arkadiyk |
| ▲ | MC1N40uy2RGA9r-ZCcSI8gA | 004CXXXX | 0840XXXX | PENDING_NEW | 04/25/2005 12:00:00 AM | arkadiyk |
| ▲ | rJz0FEW12RGWI615k0LB8wA | 004CXXXX | 0840XXXX | PENDING_NEW | 04/26/2005 12:00:00 AM | arkadiyk |
| ▲ | Up-NZ0e12G8ba15k0LB8wA | 004CXXXX | 0840XXXX | AUTHORIZED | 04/26/2005 12:00:00 AM | arkadiyk |
| ▲ | BLG_AU612RGmca15k0LB8wA | 004CXXXX | 0840XXXX | CANCELED | 04/26/2005 12:00:00 AM | arkadiyk |
| ▲ | lt2fs0K22RgrHa15k0LB8wA | 004CXXXX | 0840XXXX | CANCELED | 04/26/2005 12:00:00 AM | arkadiyk |
| ▲ | 9QNNaOi22RGZ9a15k0LB8wA | 004CXXXX | 0840XXXX | ERROR | 04/27/2005 12:00:00 AM | arkadiyk |
| ▲ | 4sctvMC22RG_3q15k0LB8wA | 004CXXXX | 0840XXXX | UNAUTHORIZED | 04/27/2005 12:00:00 AM | arkadiyk |

800

```
┌─────────────────────────────────────┐
│ Display a Directory Comprising One  │
│ or More Manual Actions to a User    │
│                802                  │
└─────────────────────────────────────┘
                  │
                  ▼
┌─────────────────────────────────────┐
│ Receive a Selection Identifying a   │
│ Manual Action From the User         │
│                804                  │
└─────────────────────────────────────┘
                  │
                  ▼
┌─────────────────────────────────────┐
│ Submit the Identified Manual Action │
│ to an Automated Workflow Process    │
│ to Execute the Identified Manual    │
│ Action                              │
│                806                  │
└─────────────────────────────────────┘
```

FIG. 8

ACTION CONSOLE FRAMEWORK

CROSS-REFERENCE TO RELATED APPLICATION

This application claims the benefit of U.S. Provisional Patent Application Ser. No. 60/721,289, entitled "ACTION CONSOLE FRAMEWORK," and filed Sep. 27, 2005, the specification for which is hereby incorporated by reference.

FIELD OF THE INVENTION

The present invention generally relates to software tools for use in association with a distributed computing system or computer network.

BACKGROUND

In a fully automated processing environment there often exist exceptions, anomalies and adjustments that do not lend themselves to the automated process. Conventional automated processing platforms may not properly accommodate exceptional circumstances that may arise but that either cannot, by their nature, be automated, or for which automation is not cost effective. Thus, even in a highly automated environment, there will be a need for a manually initiated activity. In a distributed computing system of an automated platform for a financial investment institution, manually initiated activities may be required in several areas. These areas include journal processing, such as, balancing write-offs by a fixed income division (FID), initiating client payments, amending or canceling a trade, sending a duplicate copy of a confirmation based on a client request and so on.

Manually initiated activities, however, are subject to several shortcomings with respect to conventional automated processing platforms. In this respect, manually initiated activities (e.g., data entry) may not incorporate best practices such as compliance with regulators, auditors, operational risk management groups, business partners and the like. Further, conventional automated platforms may not provide the appropriate infrastructure to apply suitable business rules defined at the manual event level. Such platforms also may not provide datagates at the account level, authorized workflows and/or robust audit trails.

SUMMARY

In one embodiment, a directory that comprises one or more manual actions is displayed to a user. A selection identifying a manual action is received from the user. The identified manual action is submitted to an automated workflow process to execute the identified manual action.

BRIEF DESCRIPTION OF THE DRAWINGS

FIG. 3 illustrates one embodiment of a screen view of a client application enterprise query service basic balances screen.

FIG. 4 illustrates one embodiment of a write-off console screen view.

FIG. 7 illustrates one embodiment of an action console framework query facility screen view for an action console framework query facility process.

FIG. 8 illustrates one embodiment of a logic flow.

DESCRIPTION

Figure 1:
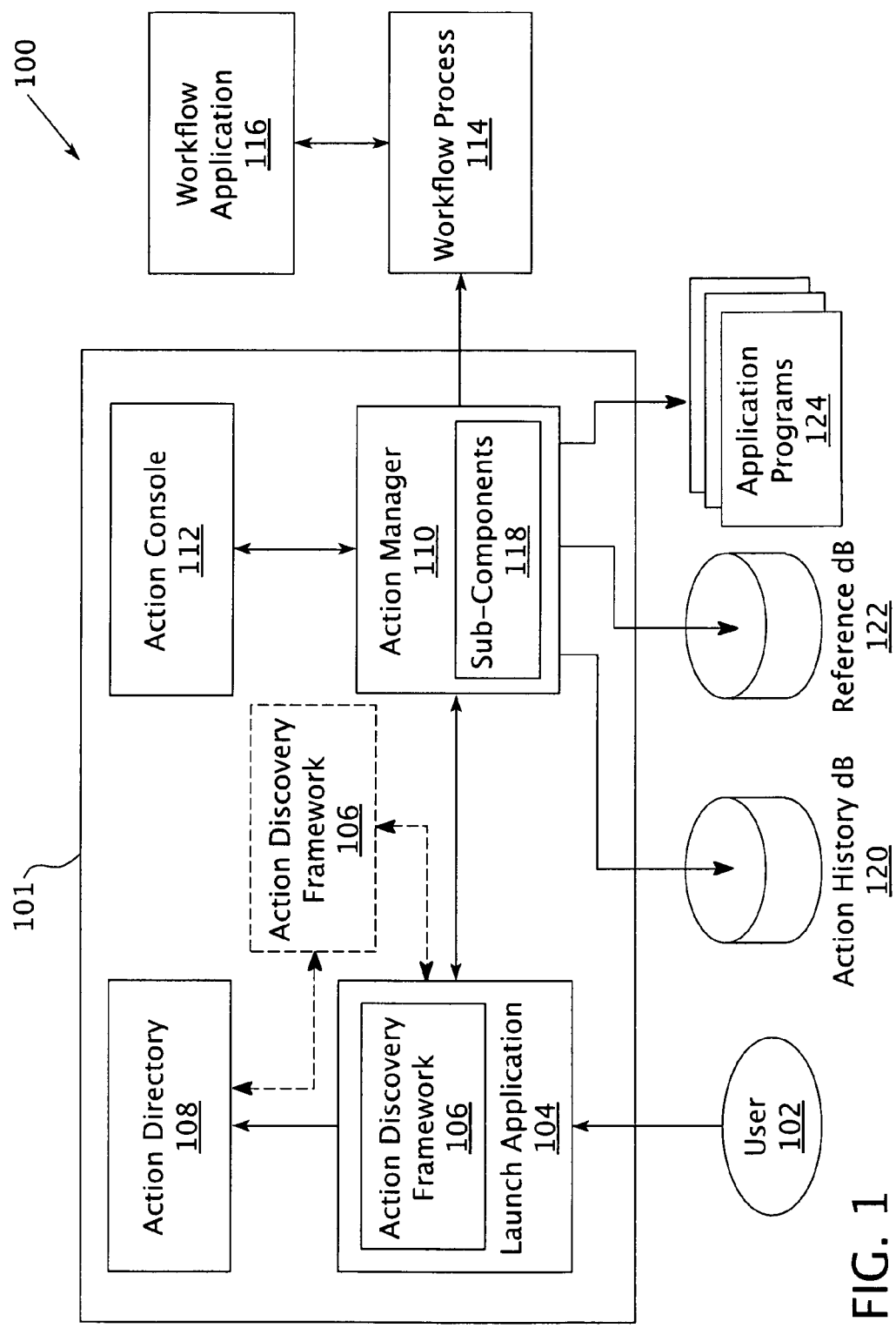
FIG. 1 illustrates one embodiment of a processing system comprising an action console framework.

Embodiments of an action console framework are described. In one embodiment, an action console framework may be configured to address problems with automated processing of computer systems or computer networks, such as distributed computer networks. Some processing tasks performed in a computer network may not be automated or cannot be automated. One problem area for computer network processing involves exceptional situations such as when an order has a bad account number, for example, that requires manual intervention for correction and then resubmission of the order for reprocessing by the computer platform. In another example, there may be personnel working for a firm who on a daily basis look through a set of accounts looking for small debit balances for clients that have been unresolved for some period of time. These personnel may determine that the small balances are uncollectible and will recommend writing off the balances. Such write-off of balances is an example of a manual decision that may never be automated because of the human judgment required to make the decision. The action console framework tries to make it easy to conduct write off applications like these in a way that will meet auditing requirements and entitlement issues for the firm, while accommodating business logic or business rules that might apply to action taken in a particular scenario.

In various embodiments, the action console can provide a story line for how an action line or action message gets created and injected into the processing system, and a number of software pieces are provided to support that story line. There are parts of the action console that may be provided by the specific development team responsible for deploying the action. So a team working with a business that wants to do write-offs, for example, can provide probable pieces of the overall framework that can be combined with the standard pieces to create and deploy a full application.

The life cycle of an action in the present context may start with an application outside the action console framework; this application outside the action console may be referred to as the "launch application." For example, a person who wants to do write-offs may be looking at a query screen wherein a list of account balances may be presented for some cross section of accounts, such as a typical query application that looks at balances and explains them to the user. When the user sees a line in this display to write off, then the user may click on that line item and see on a context sensitive menu, for example, the option that says, "write this off." And if the user chooses that option, then the write-off scenario can be initiated. That option can be configured to show up on the menu, for example, only if it makes sense to permit the user to write off the balance. So, for instance, such a menu option should not normally show up on a credit balance query. This is an example of a business rule that should preclude the user from attempting to write off the credit balance.

A first part of the action framework may be embodied in creating the menu that the user sees when clicking on one of these items and this is called the action directory. So, this is a means by which the query application, when it is about to display a list of items to the user, can send details for those items to one or more action directories which are independent applications. The action directories may examine each one of the items being displayed and make a determination of which actions that it knows should be put on the menu for each one of those items. This activity may involve several different action directories. One action directory may be provided by the London Interbank Offered Rate (LIBOR) team that knows about the things that can be done with deficient balances; another action directory may be supplied by the trade completion team that knows about trades, and so forth. The same line item may relate to more than one action directory; and the launch application can make the necessary queries. As results are gathered, one overall menu can be generated showing all the things that can be done to a particular line item.

Once the user picks a menu item, then the launch application can spawn the action console in another window. The action console is what a user might think of as a web application that enables performance of write-offs. So if the user found an entry to write off in a different application, then the user can be presented with a console that permits entry of information needed for submitting and processing the write-off. The action manager requests information about the item being acted upon, so it will get all the details shown to the user. The action manager takes the details and sends them through business rules that are designed specifically around the type of action being invoked. This is an example of a write-off action being requested and the business rules know to check to make sure a credit balance write-off is not being attempted.

Once the initial pass through the business rules is complete, if everything does not check out, then the action console can withdraw the message to be sent to the platform and terminate the action. If everything does check out, then the action manager can display a web interface which has information that came in from the launch application, as well as other related information that was obtained from potential reference dated sources or other data sources as well as fields that the user is expected to fill out. So, for example, the user might have check boxes or drop-down lists to select places to enter information in the action console. This activity is designed to fill out the complete definition of the action. An operating assumption is that only part of the information required for the action comes in from the launch application. The rest of it is either obtained from data sources or may be obtained from the end user.

The business rules tell the action manager which screen to show. So, for a given action, the user might go through a sequence of screens to fully define the action. Once the business rules have finished analyzing the data, the action manager may then invoke the screens corresponding to the analysis. This may be a custom screen specifically designed for this application. One benefit of the invention can be seen when the user is performing a write off, for example, and the user does not merely get a generic-looking application that does not relate to write off functionality. The application is designed to steer the user into a write off work flow and provide information to the user that is pertinent to write offs. The application may be a web application, for example, configured to look different or more distinctive than another application used for amending a trade, for example.

Once the user finishes filling out the information on the screen, the user can hit submit to go back to the action manager. This action will send the newly updated data through the business rules, and the business rules may then respond by presenting another screen, for example, and that other screen can be shown to the user. Eventually, the business rules notify the user that the action is now completely defined. Once the business rules confirm that the action is fully defined, then the user gets a confirmation screen to verify the user wants to proceed or not proceed with the action. If the user confirms the action, then the action can be submitted into a work flow process for approval. The work flow process is determined based on the particular business scenario being dealt with by the user. For example, the work flow process may involve sending an e-mail to a group of users requiring a button click to acknowledge approval of the action. Approval may also involve several levels of authorization at various supervisory levels within a firm.

If the approval is returned successfully, then a message can be created with all the details associated with the action definition, and the message can be sent to the appropriate application in the platform for processing. So, from an application point of view, the action console framework involves processing a manual event through the same mechanization as the automated event flows in a computer network. The message may have distinctive values for message type, so the application knows that the message represents a manual event, for example, and can take appropriate steps in accordance with the message type.

The action manager can maintain history for actions that have been created and what happened to them, whether they got approved or rejected, what happened to them once they were sent into the processing systems, and so forth. Users can thus review the history at any time and retrieve actions that were created earlier and cancel the action, which may cause a cancel message to be sent to the processing applications; or they can amend the message, which means they may be returned to the definition screen; or they can change some of the values entered previously, and then send the changes to the processing application as an amendment of the previous action.

The invention provides tools for application developers to perform actions in a processing system efficiently and effectively. It provides standard entitlement checks and standard business rules, and facilitates setting an audit trail to satisfy auditor requirements. The invention also offers a standard way of invoking authorization steps, and a standard way of sending a final action to the processing system using existing message formats.

FIG. 1 illustrates one embodiment of a processing system 100 comprising an "action console framework" or "ACF" 101. In one embodiment, the ACF 101 may be employed to inject manually created messages into automated platform information flows. The ACF 101 may comprise a collection of software components and a pattern for their extension and use that facilitates the provisioning of "manual interventions," or "actions," into a distributed message-based processing system whose behavior is otherwise fully automated. The ACF 101 allows creators of the processing system 100 to accommodate exceptional circumstances that may arise but that either cannot, by their nature, be automated, or for which automation is not cost effective. The manual interventions initiated through the ACF 101 may be affected by means of messages that may be similar or even identical to those normally transmitted by the automated processing information flows. These messages, however, are created by the ACF 101 in response to the actions of a specific end-user, e.g., user 102, rather than by normal processing or business events.

In various embodiments, the ACF 101 may comprise one or more components. These components may comprise a launch application 104, an action discovery framework 106, an action directory 108 and an action manager 110. The action manager 110 may be coupled to an action console 112. The action console 112 may provide a user interface for creating an action line or action message and injecting it into the processing system 100. A number of software elements may be provided to support the action. One or more components of the action console 112 may be provided to the user 102 responsible for deploying the action.

one embodiment, the launch application 104 may comprise an end-user application to provide a starting point for the user 102 to initiate an action. The launch application 104 may be a query facility to provide views into transactional databases or audit trails, or virtually any other conceivable application. The launch application 104 may provide a menu or other appropriate functionality for the user 102 to initiate an action while using the launch application 104. In one embodiment, the launch application 104 may be implemented as a query application that presents query results in table form arranged in one or more rows. The query application may create a menu attached to each row, listing the actions that are appropriate for that particular row. In another embodiment, the launch application 104 may be or may comprise a client application. The client application may be implemented as an enterprise query service (EQS) to create, modify, retrieve and manipulate data from relational database management systems. The client application also may provide various views to the user 102 including links to launch the action console 112.

The action discovery framework 106 optionally may be implemented within the launch application 104 to determine, based on context, any set of actions that may be appropriate for the user 102 in a given situation. In one embodiment, shown in broken line, the action discovery framework 106 may be provided outside the launch application 104, for example. The action discovery framework 106 may be employed by the launch application 104 to create a specific menu to be attached to each row, based on the specific data values in the row.

The action directory 108 may be a network service called upon by the action discovery framework 106. The action directory 108 enables intelligent line-item menuing from the launch application 104, such as, for example, the EQS application, a workflow application 116 and any other suitable application capable of launching an appropriate action console 112. The action directory 108 may examine one or more contexts as provided by the launch application 104 (e.g., several rows from a tabular display) and return the appropriate actions for each context. As "context" may include the credentials of the user 102, the action directory 108 may make use of entitlement services in making its determination.

The action manager 110 may be coupled to a workflow process 114 that is coupled to the workflow application 116. The workflow process 114 may be implemented as a workflow system that is presumed to exist but may not itself be a component of the ACF 101. The workflow process 114 may be instantiated with details of the requested action and is expected, eventually, to notify the action manager 110 that the action has been properly approved or rejected. The workflow application 116 may be a workflow tool used by a second party to approve certain activities such as manual interventions or actions initiated by the user 102.

The action manager 110 may employ action-specific sub-components 118 to ensure that the user 102 requested action does not violate any applicable policies or regulations. The action manager 110 may be coupled to one or more action history databases 120, reference databases 122 (e.g., data sources) and application programs 124. The data sources associated with the reference database 122 may be plugged in to provide enrichment and/or validation of action parameters. The action history database 120 may be employed to store actions for later review or subsequent action. The reference database 122, e.g., data source, may comprise information associated with the launch application 104 and/or any information related to the action. The application programs 124 may be employed to process messages associated with the relevant action initiated by the user 102. Examples and various embodiments of these components are described below.

The action manager 110 may be implemented as a software process to manage the initiation of actions. It may include one or more sub-components 118. In various embodiments, the action manager 110 sub-components 118 may comprise one or more entitlement manager, business rules engine, data enrichment service, graphic user interface (GUI) manager, approval workflow manager, action message generator, action progress tracking and the action history database 120. The business rules, for example, assure that manual events or manually initiated activities are properly formulated and do not violate any business process requirements of the organization.

In various embodiments, the action manager 110 may respond to a new action invoked by the user 102 using the launch application 104. In response to the new action, the action manager 110 may execute any combination of functions. For example, the action manager 110 may execute an entitlements manager function. The entitlements manager may be an external entitlements service. In one embodiment, the ACF 101 may assume that the external entitlements service exists, but may not necessarily be part of the ACF 101. The external entitlements service is to ensure that the user 102 is entitled to initiate the requested action.

In addition, the action manager 110 may check the incoming action parameters using action-specific business rules to ensure that the request does not violate any applicable business policies and practices of the organization. For example, in the context of a financial platform for a financial institution, a requested action may take the form of an action to write off a small balance. This write off, however, may violate certain business rules and fail if the balance is a credit rather than a debit. These business rules also may cause data enrichment services to be invoked to obtain additional information from the reference databases 122 or other data stores that may be required to fully define the action.

In one embodiment, the action manager 110 may present an action-specific GUI to the user 102 via the action console 112 to solicit additional parameters needed to completely define the action. When the user 102 submits the input, the action manager 110 may invoke business rules to ensure the action remains valid, and/or to further enrich the action by querying data repositories such as the reference database 122 or other data sources. The action manager 110 may repeat this sequence of presenting GUI screens to the user 102 and passing each newly augmented/edited set of action parameters to the business rules until the business rules indicate that the action has been completely defined. The determination of which GUI screen to present at each step may be driven by the business rules sub-components 118, allowing for scripted sequences as may be required in the overall definition of an action. Once the action is completely defined, the action manager 110 may present a final "confirmation screen" to the user 102 on the action console 112 to permit the user 102 to review the action and decide whether to proceed or cancel the action. The action definition may be obtained from the user 102 via the GUI screens presented by the action console 112. The GUI screens may be customized to the relevant business process.

Upon confirmation from the user 102, the action manager 110 instantiates the workflow process 114 to approve the action. The ACF 101 assumes that the workflow process 114 exists but may not necessarily be a component of the ACF 101. The workflow process 114 may be instantiated with the details of the requested action and is expected, eventually, to notify the action manager 110 that the action has been properly approved or rejected. The action manager 110 stores all action details in the action history database 120 while awaiting such notification. Once a given action is approved, the action definition may be used to construct an appropriately formatted message, which is then sent to the application programs 124 designed to process the message. The application programs 124 may not necessarily form a component of the ACF 101, but rather may be implemented to interface with the ACF 101. The complete details of the application programs 124 may be stored in the action history database 120 for later review or subsequent action. The action manager 110 is prepared to receive notifications from the workflow application 116 in the workflow process 114 (or any other applications downstream of the ACF 101) regarding the progress of the initiated action. Such notifications may be stored in the action history database 120 as they are received.

As previously discussed, the action manager 110 may provide a GUI. In one embodiment, the action manager 110 GUI may be provided by the action console 112. In one embodiment, the action manager 110 may present action-specific GUI screens to define new actions. The action manager 110 also may incorporate a GUI to enable search and review of previously initiated actions. If the user 102 is appropriately entitled, the user 102 may specify queries to locate and retrieve prior actions, and also may perform operations on any retrieved actions. The operations may include to amend, cancel and/or clone a previously defined action. These operations may be supported by a comprehensive audit trail of previously defined actions.

One or more operations may be performed on previously defined actions stored in the action history database 120. One operation that may be performed on a previously defined action is to amend the action. The action manager 110 presents the user 102 with the same GUI screens as may be provided when the action is initially defined. This allows the user 102 to amend or modify the action definition. Business rules sub-components 118 and the approval workflow process 114 may be used to process the amended action as though it were a newly defined action. When approval is obtained for the amended action, the action manager 110 constructs a new message to be sent to the processing application program 124 carrying the amended action definition. This message includes information to permit the processing application program 124 to link the new message to the original action or to a previously amended action and to properly process the new message as an amendment to the prior action.

Another operation that may be performed on a previously defined action is to cancel the action. When the action is approved, the action manager 110 sends a message to the processing application program 124 requesting that the original action (or the most recently amended action) be canceled.

Another operation that may be performed on a previously defined action is to clone the action. The action manager 110 initiates the definition of a new event, with some or all of the definitions copied from the retrieved previously defined action.

In deploying a new action via the ACF 101, several customizations may be required by the user 102 or team implementing the new action. If the action discovery framework 106 is to be used, these may comprise the customization of one or more action directories. GUI screens implemented by the action console 112 may be customized to support a full definition of an action by the user 102. Business rules sub-components 118 may be customized to check the validity of an action definition and to coordinate the presentation of the GUI screens during the definition process. Approval workflow process 114 definition may be customized to assure that any required approvals are obtained before the action is submitted for processing to the application program 124. Message templates may be customized to properly package the defined action in a message to be sent to the processing application program 124.

Figure 2:
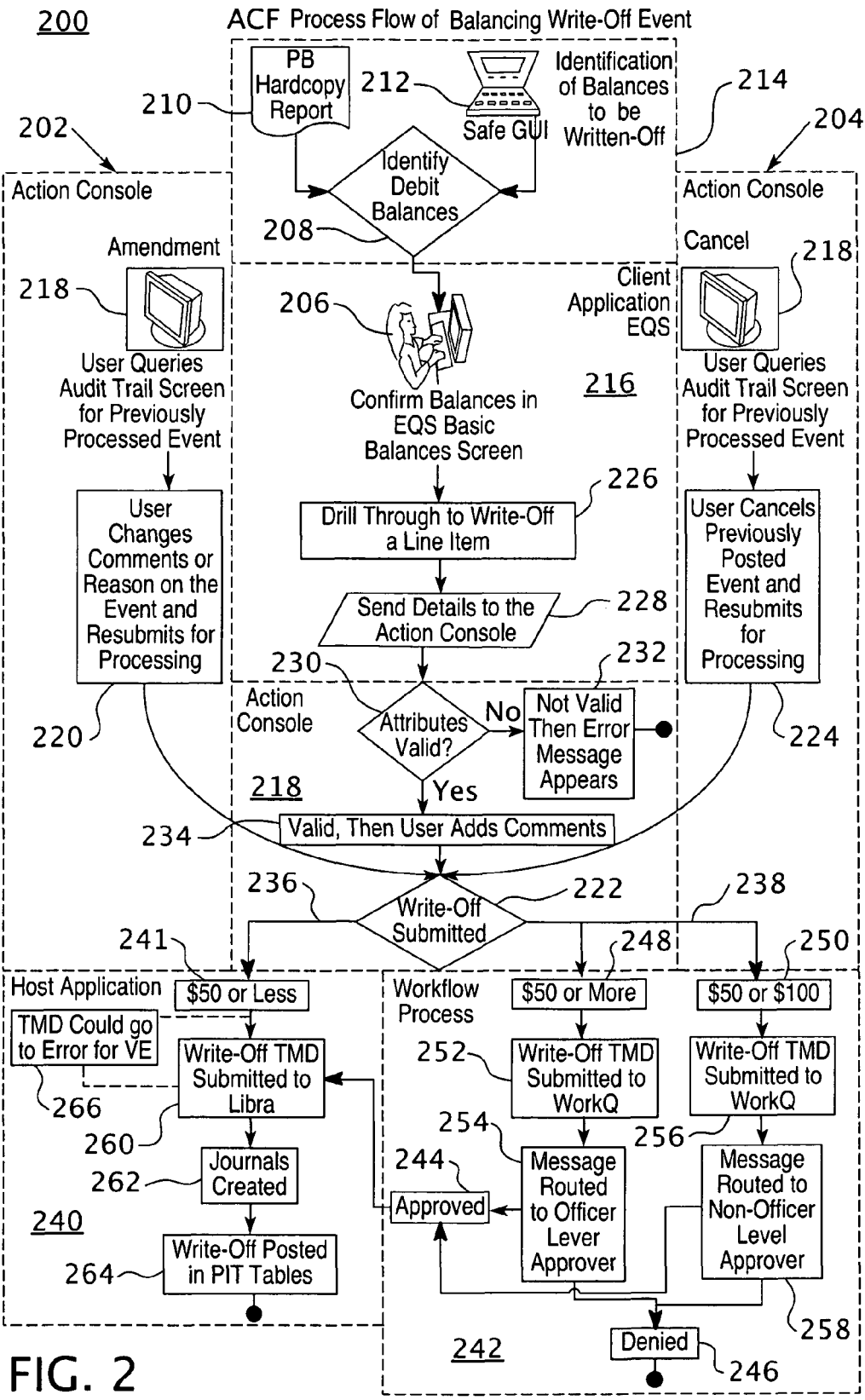
FIG. 2 illustrates one embodiment of an action console framework process flow.

FIG. 2 illustrates one embodiment of an ACF process flow 200. In the illustrated embodiment, the ACF process flow 200 may be implemented to perform a write-off type of action or event. The ACF process flow 200 may be representative of a write-off type of action or event, for example, that may be performed by a balancing group in a financial institution. In a financial institution, a balancing group may be assigned the responsibility of reconciling positions and balances within customer accounts. Occasionally, residual balances remain in customer accounts after settlement. Although automated processes may be used to create write-off events for amounts under $50 (e.g., United States Dollars or "USD") in order to close a mission, there may be a potential for small balances to remain in the customer accounts due to settlement differences, wire errors, and any errors arising from canceled or amended actions. The balancing group is responsible for manually writing off these differences from the customer accounts to a write-off account. It will be appreciated that write-off events may be created for both debit and credit balances. The following discussion, however, is focused primarily on write-offs for residual debit balances. The embodiments, however, are not limited in this context.

It will be appreciated that the scope of the illustrated embodiment may be described in the context of a write-off process as may be implemented by the balancing group in the financial institution. Other groups or projects may use the ACF process flow 200 to perform a write-off event or may use a modified version of the ACF process flow 200. While multiple groups within the financial institution may perform the write-off events, such process/requirements may be different from those described herein with respect to the ACF process flow 200. The scope of the illustrated embodiment, however, should not be limited in this context as minor modifications may be required to enable other groups to leverage the illustrated write-off process in a suitable manner. The scope of the ACF process flow 200 may be suited for a particular application in accordance with multiple attributes. These attributes may comprise location, group, write-off actions only, debit balances only, account level only, balanced entries only (no single-sided write-offs), write-off one account at a time among others. The embodiments, however, are not limited in these contexts.

In one embodiment, the ACF process flow 200 operations may be performed on previously defined retrieved actions. These operations include amending 202 an action and/or canceling 204 an action associated with a balancing write-off event. A user 206 initially identifies 214 balances to be written-off. The user 206 executes a launch application such as, for example, a client application 216 to identify 208 any debit balances. The client application 216 may be an EQS application. The user 206 may identify 208 debit balances via a positions and balances hardcopy report 210 or via a simulation analysis of financial exposure (SAFE) application 212 GUI, for example. The client application 216 may comprise one or more EQS query application basic balance screens. The user 206 manually confirms the balances provided by the client application 216 EQS basic balances screen. The EQS basic balances screen of the client application 216 is the final verification point used by the user 206 when determining if an account balance is eligible to be written off. The client application 216 EQS basic balances screen may serve as the entry point to an action console 218 to release the write-off action for approval or denial.

The action console 218 may be invoked through the EQS basic balances screen of the client application 216. The user 206 selects the appropriate action, e.g., a "write-off" action, from a menu on the record to be written off. Once a user clicks on the appropriate action, e.g., "write-off," the client application 216 EQS will launch the action console 218 in a new browser window. The client application 216 will send information about the selected record for the write-off process to the action console 218. The client application 216 may be employed to search balances and journals and to initiate an action, for example. The user 206 may query the EQS basic balances screen for data to be actioned or to see the effect of a previously posted event.

As previously discussed, the EQS basic balances screen of the client application 216 provides a "write-off" option listed within a drop-down list or menu. In one embodiment, the "write-off" action may be hard coded into the drop-down list and in other embodiments a list of eligible actions based on user entitlements and object eligibility may be dynamically generated. The process of selecting the "write-off" action within a drop-down list associated with a particular record may be referred to as action discovery. Clicking on the "write-off" option in the list launches a new browser window and in one embodiment launches the action console 218. In one embodiment, the client application 216 may be implemented to accommodate actions to be initiated one record at a time. The write-off events action may impact both a transaction and base ledger of an account regardless of which record is selected.

The client application 216 collects relevant information that may be required by the action console 218 in various data input fields provided by the EQS basic balances screen. The client application 216 may pass one or more of these fields to the action console 218 for write-off processing. These fields may comprise: account ID, account/asset level, core balance type, transaction currency, base ledger currency, as-on settlement date principal amount, company code, and holding code, among other fields, for example.

Records that may not be eligible for the write-off process that appear in the EQS basic balance screen may have one or more of the following attributes: asset level balances, negative balance values which represent credit balances, pierpont fund holding IDs, hearsay holding IDs and base amounts with no associated transaction amounts, among other records, for example.

Clicking the "event" (e.g., write-off action) option within the drop-down list on the client application 216 journal screen takes the user 206 to the action console 218 audit trail summary screen if the journal was created by a write-off action. This screen will contain the details of the write-off event associated with those journals.

The user 206 also may be able to search for the journals created by the write-off event in the host application 240 journal screens.

In one embodiment, the drop-down list may be dynamically populated with actions that the user 206 may be entitled to perform in concert with any actions that are eligible for the displayed object.

FIG. 3 illustrates one embodiment of a screen view 300 of a client application EQS basic balances screen. The EQS basic balances screen view 300 comprises one or more tabs such as the positions and balances tab 302 to display customer positions and balances. The EQS basic balances screen view 300 also comprises one or more data input fields 304-1–n (where "n" is any positive integer) to collect relevant information that may be required by the action console 218 (FIG. 2). These fields may comprise, for example, an account No. field 304-1, a security ID field 304-2, an options drop-down list field 304-3, a "from" query date field 304-4, a transaction currency field 304-5, a "to" query date field 304-6, an account level field 304-7 and a format field 304-8, among other fields. Any number of "n" fields 304-1–n may be provided. The EQS basic balances screen view 300 also provides a view of records 306-1–m (where "m" is any positive integer). As illustrated, the record 306-2 is selected by the user 206 to be written off. A drop-down list 308 provides a list of actions. One such action is the write-off action 310. The selection of the write-off action 310 option launches a new browser window and, in one embodiment, launches the action console 218.

With reference now back to FIG. 2, the user 206 may employ the action console 218 to initiate write-off actions from the EQS basic balances screen view 300 (FIG. 3) of the client application 216. The EQS basic balances screen view 300 of the client application 216 will send information specific to the record 306 (FIG. 3) being written-off when the user 206 initiates the action. The action console 218 may employ this information to pre-populate specific fields within a write-off form. The action console 218 also may validate if the user 206 is entitled to perform the selected action. Once in the action console 218, the user 206 may change and/or add information to specific fields prior to submitting the action for processing (e.g., approval or denial). The user 206 may terminate the action at any time. Terminating an action prior to submitting the action for processing will effectively delete any trace of the action as though it never occurred. Once the user 206 submits the action for processing, the entitlements will be revalidated. Edit checks also may be performed to ensure that all required information has been populated. Once the action passes the edit checks, the user 206 is brought to a confirmation screen where the user 206 may terminate the event or submit it for processing. Once the action is submitted for processing, the action audit trail records the action as well as its status. If the event fails any of the edit checks, the user 206 may be prompted to fix the issue.

Accordingly, in operation, the user 206 may initiate a write-off action from the client application 216 EQS basic balance screen view 300 (FIG. 3). The action console 218 is launched in a new browser window when the user 206 initiates the write-off action by clicking on the write-off action 310 (FIG. 3) option in the drop-down list 308 (FIG. 3). If the user 206 is entitled to perform a write-off, the new browser will contain the appropriate action console write-off form. These entitlements may be driven by any suitable software application. If the user 206 is not entitled to perform a write-off, the new browser displays an error message stating that the user 206 is not permitted to perform the write-off action. These entitlements also may be driven by a suitable software application. If an error occurs in the process, an example error message may read: "You are not entitled to perform this action, please contact the helpdesk for access."

The write-off form may be pre-populated with record key information sent from the client application 216 EQS basic balances screen view 300 (FIG. 3). Information may be sent via the EQS basic balances screen view 300 and should be pre-populated in the write-off form. Such information may comprise: source account number (i.e., the account number that contains the balance to be written off); account/asset level; core balance type of the balance to be written off; transaction currency of the balance to be written off; base ledger currency of the balance to be written off; as-on settlement date principal amount of the balance to be written off; company code of the account containing the balance to be written off; and holding ID of the balance to be written off, for example.

Various validations may be performed on the fields being passed from the client application 216 EQS basic balances screen view 300 (FIG. 3) to the action console 218.

The action console 218 may display an error message stating the record is not valid for write-off if any of the above fields contain an invalid value. The error message may specify which fields failed validation.

Various enrichments may be performed by the action console 218 and populated in the write-off form. The action console 218 may check the entitlements of the user 206 before submitting the write-off. This may ensure that the user 206 is properly entitled to initiate the write-off action before the write-off is officially sent for posting.

Figure 5:
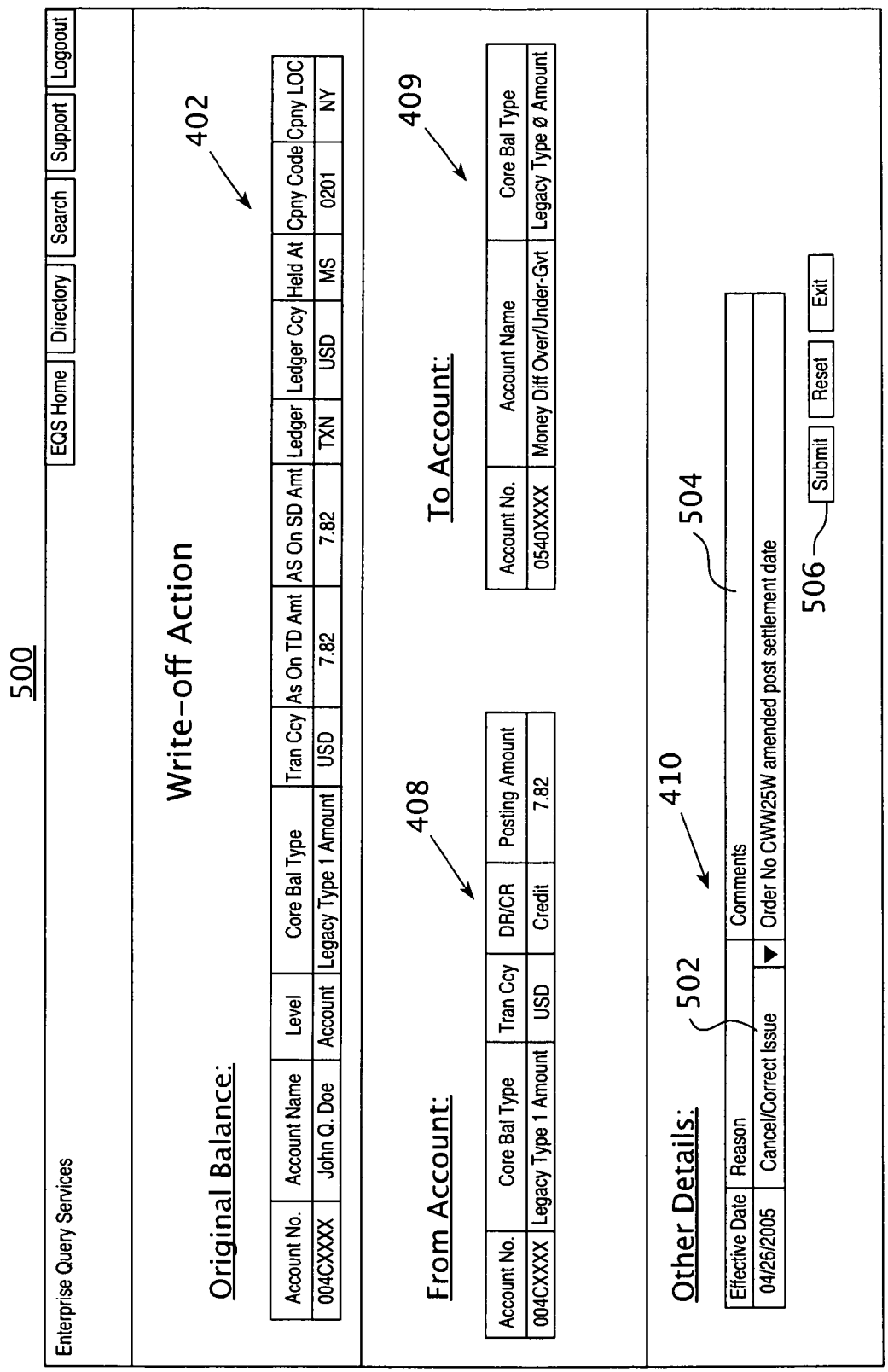
FIG. 5 illustrates one embodiment of a write-off console screen view.
Figure 6:
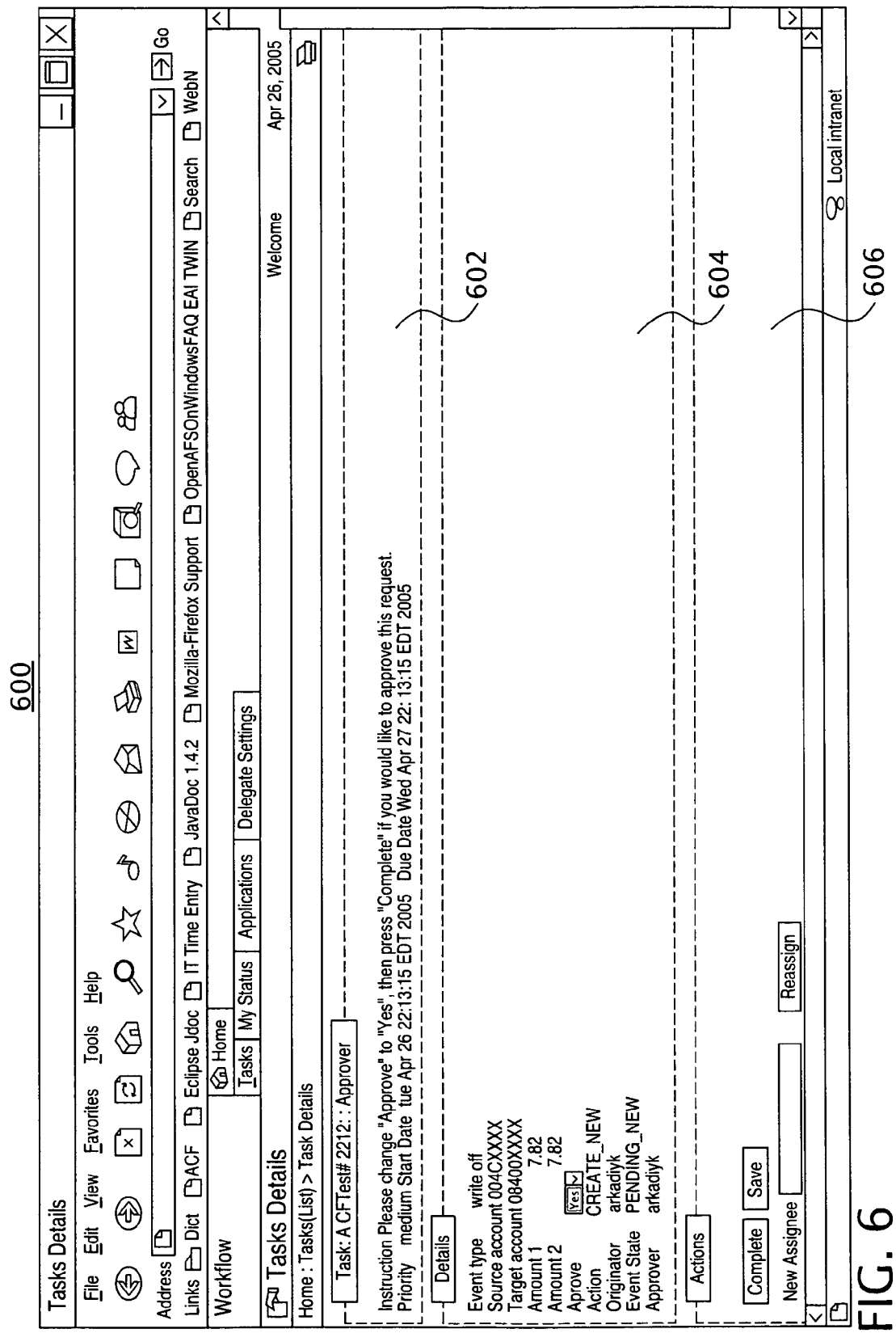
FIG. 6 illustrates one embodiment of a workflow process screen view.

FIGS. 4-6 illustrate various embodiments of action consol screen views 400, 500, 600.

FIG. 4 illustrates one embodiment of a write-off console screen view 400. The write-off console screen view 400 displays original balance information 402 as actioned from the EQS basic balances screen view 300 (FIG. 3). Business rules drive the validation for each action such as account level balances only, debit balances only and settlement date balance. Business rules also drive the enrichment for each action. "To" account information 409 includes a "To" account number 404 and a core balance type 406 is derived. The "From" account information 408 is provided via the EQS basic balances screen view 300. Other details 410 may include reasons for taking the write-off action in a drop-down list 412. As previously discussed, these reasons may comprise: statement differences, problem with wire, cancel/correct issue, among others, for example.

FIG. 5 illustrates one embodiment of a write-off console screen view 500. The write-off console screen view 500 displays a reason tab 502 with the reason codes that are dynamically generated per action in the other details 410 (FIG. 4) information section. In the illustrated embodiment, the reason tab 502 indicates that the action was dynamically generated to "cancel/correct issue." The content, e.g., original balance information 402, From Account information 408 and To Account information 409 is validated prior to being sent downstream for processing (FIG. 4). In operation, the user 206 (FIG. 2) may select the "Reason" tab 502 to view a description of why there is a residual balance. The user 206 may type-in comments under the comments tab 504, which will populate the journal descriptions. The user 206 clicks on the "Submit" button 506 when complete. A final set of validations may be performed and an error message is generated if any validations fail. If all validations pass, all validated results in the action are submitted to a workflow application 242 process (FIG. 2).

With reference now back to FIG. 2, the user 206 may be responsible for writing off residual balances within the client accounts they cover. The identification 214 of the residual balances is processed manually. The starting point for the manual investigation process may be the SAFE application 212 and/or the positions and balances hardcopy reports 210 sourced from positions and balances data marts, for example. An account balance may be considered eligible for the write-off process when the balance is an account level settlement date debit balance. Account balances identified as eligible for write-off are then confirmed in the EQS basic balances screen view 300 (FIG. 3) of the client application 216.

The user 206 may represent a balancing group within a financial institution. The write-off process may comprise entitlements for data security, action permissions and application security, for example. Organizational data may be fed to a first application to drive the action permissions and the application security. Account level security may be obtained from a single source. The members of the balancing team, e.g., the user 206, may hold several different roles. One role is that of group initiator. In this role, the user 206 is able to view and query using the EQS client application 216 and the action console 218 application. The user 206 also may be able to perform a write-off action on the accounts they are entitled to see. In this role, however, the user 206 may not approve journals.

Another role of the user 206 is that of group approver. The approver may have all the access rights of the initiator with some additional entitlements. For example, the approver may have access to the workflow application 242 used to approve journals over a certain threshold. There may be several levels of authorization based on threshold amounts of the action. Non-officers designated as approvers may authorize actions up to $100 USD. Officers designated as approvers may authorize actions over $100 USD.

All write-off events containing transaction amounts in excess of $50 USD may require authorization by an approver. The action console 218 may validate an event transaction amount when the user 206 submits it for processing. Events less than $50 USD may be sent directly to the host application 240. Events greater than $50 USD may be sent to the workflow manager for additional authorization. The workflow manager approver may approve or reject the action. Approvals 244 are sent to the action console 218 for audit purposes and the host application 240 for processing. Rejections or denials 246 are sent to the action console 218 for audit purposes.

In operation, a base equivalent amount is applied to the transaction amount on the event based on a predetermined rate. The base equivalent amount may be used to determine whether an action requires workflow. Events containing a base equivalent amount less than $50 USD may be sent directly to the host application 240 for processing. Events containing a base equivalent amount greater than $50 USD will be sent to an approver for review. Events containing a base equivalent amount between $50 USD and $100 USD can be reviewed and authorized by any approver. Events containing a base equivalent amount greater than $100 USD may be authorized by an approver that has an officer title. The workflow manager may either approve or reject a message. The reviewer may update, change or delete any information on the event. The approver may not authorize any event they originally entered. Approvals may be routed to the host application 240 for processing. Rejections may be sent to the action console 218 as a terminal state. Both approvals and rejections may be used to update the status of the event in the action console 218.

Yet another role of the user 206 is that of group administrator. An administrator may have the ability to assign roles within their organization.

Another role of the user 206 may be that of a viewer. A viewer may be granted access to the query facility within the action console 218 as well as the workflow application 242. The viewer may not be able to initiate a new action, amend an action or cancel an action within the action console 218. A viewer may not be able to approve an action in the workflow application 242.

To amend 202 an action, the user 206 may employ the action console 218 to query the audit trail screen for previously processed events. The user 206 then changes 220 the comments or reason on the event and resubmits for processing. The write-off is then submitted 222 to the action console 218.

To cancel 204 an action, the user 206 may employ the action console 218 to query the audit trail screen for previously processed events. The user 206 then may cancel 224 a previously posted event and resubmits for processing. The write-off is then submitted 222 in the action console 218.

If the user is not amending 202 or canceling 204 an action, the user 206 may confirm balances using the EQS basic balances screen view 300 (FIG. 3) of the client application 216, for example. The user 206 then drills 226 through to write-off a line item and sends 228 the details to the action console 218. From the action console 218, it is determined 230 whether the attributes are valid. If the attributes are not valid, the ACF process flow 200 proceeds along the "no" path and an error message appears 232. If the attributes are valid, the ACF process flow 200 proceeds along the "yes" path and the user 206 may add comments 234 about the write-off. The write-off is then submitted 222 for processing.

Once the write-off is submitted 222, the ACF process flow 200 proceeds in accordance with the value of the write-off. For example, if the write-off amount is a first value 241 of $50 USD or less, the ACF process flow 200 proceeds along branch 236 to a host application 240 and the write-off is submitted to the host application 240. Otherwise, the ACF process flow 200 proceeds along branch 238 to the workflow application 242 where the write-off is either approved 244 or denied 246. For example, the workflow application 242 process determines if the write-off is a first value 248, e.g., of $50 USD, or more or if it is a second value 250, e.g., $50 or $100 USD. If the write-off is the first value 248 or more, the write-off is submitted 252 to an application, e.g., workQ, and the message is routed to an officer level approver 254. The write-off is then either approved 244 or denied 246. If the write-off is the second value 250, the write-off is submitted 256 to the workQ and the message is routed to a non-officer level approver 258. The write-off is then approved 244 or denied 246. If the write-off is approved 244, the process continues to the host application 240. Once the write-off is submitted 260 to the host application 240, journals are created 262 and the write-off is posted 264. If an error occurs 266, the write-off may be submitted 260 to the host application 240 once again.

FIG. 6 illustrates one embodiment of a workflow process screen view 600. The workflow process screen view 600 provides transparent business rules to drive the workflow application 242 (FIG. 2) process. The workflow process screen view 600 provides a task list portion 602 identifying the action to the approver including instructions for approving the action and the priority. A details portion 604 provides details associated with the action. An actions portion 606 provides a means for the approver to complete the action task. In operation, an action submitted by the user 206 (FIG. 2) is transmitted to the workflow process 242 and the workflow application 242 process determines whether an approval is needed based on predetermined business rules. The approvers (e.g., officer level approvers 254 and/or non-officer level approvers 258 may be defined in accordance with an organizational structure). The submitted action is approved if it satisfies the business rules. Otherwise, the action is routed to an approver. An email may be transmitted to the approver for any action requiring approval. The email may contain a link to the workflow process screen view 600 where the approver may view the action and either approve or reject the action. An approved action may be transmitted to another process for near real-time processing. The embodiments are not limited in this context.

FIG. 7 illustrates one embodiment of an ACF query facility screen view 700 for an ACF query facility process. The ACF query facility screen view 700 provides a general view 702 for all actions 704-1-p (where p is any positive integer) and a customized view for each one of the actions 704-1-p. For each action 704-1-p, a drop-down list 712 presents one or more commands 710-1-q (where q is any positive integer) for the user 206, such as event history command 710-1, event details command 710-2, cancel event command 710-3, email command 710-q and so on. Event status may be reported to the ACF 101 (FIG. 1) and may be displayed to the user 206 under a tab 706 ("EventState") for tracking purposes. The actions 704-1-p listed are a write off event list as indicated in section 708 of the ACF query facility screen view 700. The user 206 (FIG. 2) may initiate additional actions without fixing the original event, for example. Subsequent actions associated with an event, however, adhere to all business rules applicable to the original event. Management reporting may be implemented against the ACF database. In operation, actions are stored to the ACF database, which may comprise the action history database 120 (FIG. 1), the reference database 122 (FIG. 1) and/or a combination thereof. The stored actions may be viewable in the ACF query facility process. The current status of an event may be captured by the ACF (pending approval, approved, rejected, received by downstream process, posted, etc.) and displayed to the user 206 via the ACF query facility screen view 700. The original event may be viewed, amended and/or cancelled by the user 206 via the ACF query facility screen view 700. Event details for a particular action 704-1-p may be displayed by clicking on the event details command 710-2 command in the drop-down list 712.

FIG. 8 illustrates one embodiment of a logic flow 800. In one embodiment, the logic flow 800 displays 802 a directory comprising one or more manual actions to a user, receives 804 a selection identifying a manual action from the user and submits 806 the identified manual action to an automated workflow process to execute the identified manual action.

In various other embodiments, the logic flow 800 may present an action console to the user and receive information related to the identified manual action. The information is to enable the action console to submit and process the identified manual action. The information related to the identified manual action is analyzed in accordance with predetermined business rules and it is determined whether the identified manual action is proper in accordance with the business rules. The identified action is terminated when the identified manual action is improper according to the business rules analyses. A user interface is presented to the user in accordance with the business rules. The user interface comprises the information related to the identified manual action when the identified manual action is proper according to the business rules analyses. Additional information may be received to completely define the identified manual action from the user or from a data source. The user may be presented with information pertinent to processing the identified manual action. The user may be notified that the identified manual action is defined and a confirmation screen may be presented to the user. The identified manual action may be submitted to the workflow process to execute the identified manual action when a confirmation is received from the user. A message is created comprising details associated with the identified manual action and the message may be transmitted to an application program for automatically processing the identified manual action.

The examples presented herein are intended to illustrate potential and specific implementations of the present invention. It can be appreciated that the examples are intended primarily for purposes of illustration of the invention for those skilled in the art. No particular aspect or aspects of the examples is/are intended to limit the scope of the present invention.

It is to be understood that the figures and descriptions of the present invention have been simplified to illustrate elements that are relevant for a clear understanding of the present invention, while eliminating, for purposes of clarity, other elements. For example, certain operating system details and modules of network platforms are not described herein. Those of ordinary skill in the art will recognize, however, that these and other elements may be desirable in a typical computer system or e-mail application, for example. However, because such elements are well known in the art and because they do not facilitate a better understanding of the present invention, a discussion of such elements is not provided herein.

Any element expressed herein as a means for performing a specified function is intended to encompass any way of performing that function including, for example, a combination of elements that perform that function. Furthermore the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that at least some of the embodiments described herein may be implemented in many different embodiments of software, firmware, and/or hardware. The software code or specialized control hardware which may be used to implement embodiments of the invention is not limiting. For example, embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. The operation and behavior of the invention embodiments may be described without specific reference to specific software code or specialized hardware components. The absence of such specific references is feasible, because it is clearly understood that artisans of ordinary skill would be able to design software and control hardware to implement the embodiments of the present invention based on the present description with no more than reasonable effort and without undue experimentation.

Moreover, the processes associated with the present embodiments may be executed by programmable equipment, such as computers or computer systems. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a carrier wave modulated, or otherwise manipulated, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary. A computer-readable medium may further include one or more data signals transmitted on one or more carrier waves.

A "computer" or "computer system" may be, for example and without limitation, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM), and/or other computer-readable media.

In various embodiments of the present invention disclosed herein, a single component may be replaced by multiple components, and multiple components may be replaced by a single component, to perform a given function or functions. Except where such substitution would not be operative, such substitution is within the scope of the invention. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent that various modifications, alterations and adaptations to those embodiments may occur to persons skilled in the art with attainment of at least some of the advantages of the present invention. The disclosed embodiments are therefore intended to include all such modifications, alterations and adaptations without departing from the scope and spirit of the present invention as set forth herein.

The invention claimed is:

1. A method comprising:
receiving from a first application one or more items to be displayed to a first user;
for a first item selected from the one or more items, determining, by a computer system, one or more manual actions for the first item to display to the first user, wherein the one or more manual actions for the first item are determined to be appropriate for the first user to process in a given situation, wherein the given situation is described by at least one entitlement of the first user;

for the first item, displaying, by a computer system, a directory comprising the one or more manual actions to the first user;

for the first item, receiving, by the computer system, a selection from the first user identifying a manual action to be performed on the first item, wherein the identified manual action is selected from the one or more manual actions for the first item;

presenting, by the computer system, an action console to the first user;

receiving, by the computer system, information related to the identified manual action, wherein the information is to enable the action console;

receiving, by the computer system and through the action console, a request from the first user to submit the identified manual action to analysis under predetermined business rules;

determining, by the computer system, whether the identified manual action is proper according to the predetermined business rules based on analysis of the information related to the identified manual action;

when the identified manual action is proper according to the predetermined business rules:
  prompting the first user, by the computer system, for confirmation that the identified manual action should be submitted to an automated workflow process for approval by a second user;
  receiving, by the computer system, the confirmation from the user; and
  submitting, by the computer system, the identified manual action to an automated workflow process for approval by a second user; and upon receiving, by the computer system, approval for the identified manual action from the second user, initiating execution of the identified manual action.

2. The method of claim 1, comprising:
terminating, by the computer system, the identified action when the identified manual action is improper according to the business rules analyses.

3. The method of claim 1, comprising:
presenting a user interface to the first user in accordance with the business rules, wherein the user interface comprises the information related to the identified manual action when the identified manual action is proper according to the business rules analyses;
receiving, by the computer system, additional information to further define the identified manual action from the first user or from a data source;
presenting the first user with information pertinent to processing the identified manual action.

4. The method of claim 3, comprising:
notifying the first user, by the computer system, that the identified manual action is defined;
presenting, by the computer system, a confirmation screen to the first user; and
submitting, by the computer system, the identified manual action to the workflow process to execute the identified manual action when a confirmation is received from the first user.

5. The method of claim 1, comprising:
creating, by the computer system, a message comprising details associated with the identified manual action; and
transmitting, by the computer system, the message to an application program for automatically processing the identified manual action.

6. A system, comprising:
an action manager computer system, the action manager computer system to:
  receive from a first application one or more items to be displayed to a first user;
  for a first item selected from the one or more items, display a directory comprising one or more manual actions to the first user, wherein the one or more manual actions are determined to be appropriate for the first user to process in a given situation, and wherein the given situation is described by at least one entitlement of the first user;
  receive a manual action selected by the first user and from the one or more manual actions to be performed on the first item; and
  receive information related to the selected manual action; and
an action console coupled to the action manager computer system, the action manager computer system to:
  present via the action console a user interface specific to the selected manual action;
  receive through the action console a request from the first user to submit the selected manual action to analysis under predetermined business rules,
  determine whether the selected manual action is proper according to the predetermined business rules based on analysis of the information related to the selected manual action;
  when the selected manual action is proper according to the predetermined business rules:
    prompt the first user for confirmation that the selected manual action should be submitted to an automated workflow process for approval by a second user;
    receive the confirmation from the first user; and
    submit the selected manual action to an automated workflow process for approval by a second user, and,
  upon receiving approval from the second user, initiate execution of the selected manual action.

7. The system of claim 6, comprising:
a sub-component to analyze information associated with the selected manual action.

8. The system of claim 6, comprising: a launch application coupled to the action manager computer system, the launch application to receive information related to the selected manual action from the first user and to provide the received information to the action manager computer system.

9. The system of claim 8, comprising: an action discovery framework coupled to the launch application to determine the one or more manual actions.

10. The system of claim 8, comprising:
a manual action directory coupled to the launch application to enable intelligent line-item menuing from the launch application.

11. An article comprising a non-transitory computer readable medium having instruction stored thereon, which when executed by a processor cause the processor to:
receive from a first application one or more items to be displayed to a first user;
for a first item selected from the one or more items, determine one or more manual actions for the first item to display to the first user, wherein the one or more manual actions for the first item are determined to be appropriate for the first user to process in a given situation, wherein the given situation is described by at least one entitlement of the first user;

for the first item, display a directory comprising the one or more manual actions to the first user;

for the first item, receive a selection from the first user identifying a manual action to be performed on the first item, wherein the identified manual action is selected from the one or more manual actions for the first item;

present an action console to the first user; and receive information related to the identified manual action, wherein the information is to enable the action console;

receive, through the action console, a request from the first user to submit the identified manual action to analysis under predetermined business rules;

determine whether the identified manual action is proper according to the predetermined business rules based on analysis of the information related to the identified manual action;

when the identified manual action is proper according to the predetermined business rules:
prompt the first user for confirmation that the identified manual action should be submitted to an automated workflow process for approval by a second user;
receive the confirmation from the first user; and
submit the identified manual action to an automated workflow process for approval by a second user; and upon receiving approval for the identified manual action from the second user, initiate execution of the identified manual action.

12. The article of claim 11, wherein the instructions cause the processor to terminate the identified action when the identified manual action is improper according to the business rules analyses.

13. The article of claim 11, wherein the instructions cause the processor to present a user interface to the first user in accordance with the business rules, wherein the user interface comprises the information related to the identified manual action when the identified manual action is proper according to the business rules analyses; receive additional information to completely define the identified manual action from the first user or from a data source; and present the first user with information pertinent to processing the identified manual action.

14. The article of claim 13, wherein the instructions cause the processor to notify the first user that the identified manual action is defined; present a confirmation screen to the first user; and submit the identified manual action to the workflow process to execute the identified manual action when a confirmation is received from the first user.

15. The article of claim 11, wherein the instructions cause the processor to create a message comprising details associated with the identified manual action; and transmit the message to an application program for automatically processing the identified manual action.

16. A computer system comprising:
a processor;
a computer-readable memory having stored thereon instructions, which when executed by the processor cause the processor to:
receive from a first application one or more items to be displayed to a first user;
for a first item selected from the one or more items, determine one or more manual actions for the first item to display to the first user, wherein the one or more manual actions for the first item are determined to be appropriate for the first user to process in a given situation, wherein the given situation is described by at least one entitlement of the first user;

for the first item, display a directory comprising the one or more manual actions to the first user;

for the first item, receive a selection from the first user identifying a manual action to be performed on the first item, wherein the identified manual action is selected from the one or more manual actions for the first item;

present an action console to the first user; and receive information related to the identified manual action, wherein the information is to enable the action console;

receive, through the action console, a request from the first user to submit the identified manual action to analysis under predetermined business rules;

determine whether the identified manual action is proper according to the predetermined business rules based on analysis of the information related to the identified manual action;

when the identified manual action is proper according to the predetermined business rules:
prompt the first user for confirmation that the identified manual action should be submitted to an automated workflow process for approval by a second user;
receive the confirmation from the first user; and
submit the identified manual action to an automated workflow process for approval by a second user; and upon receiving approval for the identified manual action from the second user, initiate execution of the identified manual action.

17. The computer system of claim 16, wherein the computer-readable memory has stored thereon instructions, which when executed by the processor cause the processor to:
terminate the identified action when the identified manual action is improper according to the business rules analyses.

18. The computer system of claim 16, wherein the computer-readable memory has stored thereon instructions, which when executed by the processor cause the processor to:
present a user interface to the first user in accordance with the business rules, wherein the user interface comprises the information related to the identified manual action when the identified manual action is proper according to the business rules analyses;
receive additional information to completely define the identified manual action from the first user or from a data source; and
present the first user with information pertinent to processing the identified manual action;
notify first user that the identified manual action is defined;
present a confirmation screen to the first user; and
submit the identified manual action to the workflow process to execute the identified manual action when a confirmation is received from the first user.

19. The computer system of claim 16, wherein the computer-readable memory has stored thereon instructions, which when executed by the processor cause the processor to:
create a message comprising details associated with the identified manual action; and
transmit the message to an application program for automatically processing the identified manual action.

* * * * *